(12) United States Patent
Mügge et al.

(10) Patent No.: US 12,158,253 B2
(45) Date of Patent: Dec. 3, 2024

(54) ILLUMINATION APPARATUS FOR A MOTOR VEHICLE

(71) Applicants: HELLA GmbH & Co. KGaA, Lippstadt (DE); Carl Zeiss Jena GmbH, Jena (DE)

(72) Inventors: Martin Mügge, Geseke (DE); Carsten Hohmann, Warstein (DE); Alfons Michaelis, Borchen (DE); Christoph Erler, Jena (DE); Siemen Kühl, Jena (DE); Petr Vojtisek, Jena (DE)

(73) Assignee: CARL ZEISS JENA GMBH, Jena (DE)

( * ) Notice: Subject to any disclaimer, the term of this patent is extended or adjusted under 35 U.S.C. 154(b) by 29 days.

(21) Appl. No.: 18/325,656

(22) Filed: May 30, 2023

(65) Prior Publication Data
US 2023/0304643 A1 Sep. 28, 2023

Related U.S. Application Data

(63) Continuation of application No. PCT/EP2021/082689, filed on Nov. 23, 2021.

(30) Foreign Application Priority Data

Nov. 30, 2020 (DE) .................... 10 2020 131 627.5

(51) Int. Cl.
*F21S 43/50* (2018.01)
*F21S 41/24* (2018.01)
(Continued)

(52) U.S. Cl.
CPC ............... *F21S 43/50* (2018.01); *F21S 41/24* (2018.01); *F21S 41/50* (2018.01); *F21S 43/241* (2018.01);
(Continued)

(58) Field of Classification Search
CPC ............ F21S 43/315; F21S 43/50; G02B 5/32
See application file for complete search history.

(56) References Cited

U.S. PATENT DOCUMENTS 5,101,193 A 3/1992 Smith et al.
5,857,770 A * 1/1999 Fohl ..................... G02B 6/0048
362/509
(Continued)

FOREIGN PATENT DOCUMENTS

DE 102017124296 A1 4/2019
JP H07192510 A 7/1995
(Continued)

OTHER PUBLICATIONS

International Search Report with English translation in International Application No. PCT/EP2021/082689, mailed Feb. 14, 2022, 5 pages.

*Primary Examiner* — Eric T Eide
(74) *Attorney, Agent, or Firm* — Edell, Shapiro & Finnan, LLC

(57) ABSTRACT

An illumination apparatus for a motor vehicle comprises: a light source, an optical waveguide with an incident surface and a reflective region; and a hologram arranged on or in the optical waveguide. The illumination apparatus is configured such that light emitted by the light source enters the incident surface of the optical waveguide in the direction of the reflective region, is reflected by the reflective region inside the optical waveguide in the direction of the hologram and interacts with the hologram. The average distance between the light source and the incident surface is at least half as great as the average distance between the reflective region and the hologram.

20 Claims, 10 Drawing Sheets

(51) Int. Cl.
*F21S 41/50* (2018.01)
*F21S 43/241* (2018.01)
*F21V 8/00* (2006.01)
*F21Y 115/10* (2016.01)
*G02B 5/32* (2006.01)

(52) U.S. Cl.
CPC ............... *G02B 5/32* (2013.01); *G02B 6/006* (2013.01); *F21Y 2115/10* (2016.08)

(56) References Cited

U.S. PATENT DOCUMENTS

| | | | | |
|---|---|---|---|---|
| 11,719,410 | B2* | 8/2023 | Thaliath | .................. B60Q 1/44 |
| | | | | 362/511 |
| 2020/0240610 | A1* | 7/2020 | Thomae | ................ G03H 1/2202 |
| 2021/0108776 | A1* | 4/2021 | Kamau | ................ G03H 1/2202 |

FOREIGN PATENT DOCUMENTS

| JP | 2017-112039 A | 6/2017 |
|---|---|---|
| WO | 2018/202579 A1 | 11/2018 |
| WO | 2018/202582 A1 | 11/2018 |

* cited by examiner

ILLUMINATION APPARATUS FOR A MOTOR VEHICLE

CROSS REFERENCE TO RELATED APPLICATIONS

This application is a continuation of International Application No. PCT/EP2021/082689, filed on Nov. 23, 2021, which claims priority under 35 U.S.C. § 119 (a)-(d) to German application No. 10 2020 131 627.5 filed on Nov. 30, 2020, the entire contents of which are hereby incorporated by reference.

TECHNICAL FIELD

The present disclosure relates to an illumination apparatus for a motor vehicle.

BACKGROUND

An illumination apparatus of the aforementioned type is known from DE 10 2012 101 451 A1. The illumination apparatus, described therein, comprises a light source, designed as a light emitting diode (LED); an optical waveguide with an incident surface and a reflective region; as well as a hologram, arranged on the optical waveguide. In this case, light emitted by the light source enters the incident surface of the optical waveguide in the direction of the reflective region and is reflected by the reflective region inside the optical waveguide in the direction of the hologram. Exposure of the hologram makes it possible, for example, to reconstruct images, stored in the hologram, or to generate a desired light distribution outside the motor vehicle. In this context the illumination apparatuses, which are mentioned in this document, have comparatively short distances between the light source and the incident surface and between the incident surface and the reflective region.

The current trend in the design of automotive lighting systems has been developing for years in the direction of lights that have been becoming ever narrower and longer, as a result of which the height of the illumination apparatuses has been continually reduced and their length has been continually increasing. This feature is particularly evident in taillights and headlights, which are designed as a light strip and extend across the entire width of the vehicle. Therefore, for such narrow lighting designs, the optical waveguide elements and the optical waveguides should also be provided as narrow, but at the same time wide elements for optimal integration. The illumination apparatuses, known from DE 10 2017 124 296 A1, have comparatively short input paths or, more specifically, small distances between the light source and the incident surface as well as between the incident surface and the reflective region of the optical waveguide. Therefore, these illumination apparatuses can be used to achieve narrow and yet wide light emitting surfaces, if necessary, with a great deal of parts and a plurality of light emitting diodes.

The problem, on which the present innovation is based, is to provide an illumination apparatus of the aforementioned type that enables the design of a narrow and wide light emitting surface with a simple mechanism, wherein the hologram, arranged on the optical waveguide, is to be illuminated with as precise an angle as possible.

SUMMARY

According to an aspect of the disclosed illumination apparatus, the average distance between the light source and the incident surface is at least half as great as the average distance between the reflective region and the hologram. For example, the average distance between the light source and the incident surface together with the average distance between the incident surface and the reflective region is between 0.8 and 1.2 times as great as the average distance between the reflective region and the hologram. In this way, the light travels a large part of its way to the reflective region outside the optical waveguide. As a result, undesired reflections of the light between the incident surface and the reflective region on the side walls of the optical waveguide can be reduced or largely prevented. Such unwanted reflections could result in different illumination angles of the light, impinging on the hologram, and, thus, lead to double images and blurring in the image, produced by the hologram. Correspondingly, the extensive elimination of these reflections can ensure a clean, accurately angled illumination of the hologram.

The large distance between the light source and the reflective region results in a long path, over which the light, emitted by the light source, can expand in a transverse direction. Thus, this feature offers the possibility of a large latitudinal extent and a space-saving, compact design of the optical waveguide, so that it can also be easily integrated into small installation spaces for lights and headlights.

It can be provided that the reflective region has a larger extent in a first transverse direction, which is essentially perpendicular to the central connecting direction from the incident surface to the reflective region, than the average distance between the light source and the reflective region and/or has a larger extent than the average distance from the reflective surface to the hologram. Therefore, the input path or, more specifically, the distance between the light source and the reflective region can be used with a corresponding divergence of the light, emitted by the light source that is designed, in particular, as a light emitting diode (LED), to spread the light over a large width of the reflective region.

It is possible for the extent of the reflective region in the first transverse direction to be between 0.8 and 1.2 times as great as the extent of the hologram in the first transverse direction, preferably approximately the same amount as the extent of the hologram in the first transverse direction. Thus, the hologram can be optimally illuminated by the reflective region, which is, for example, illuminated over its entire width.

It can be provided that the reflective region is convexly curved, in particular, is designed as a paraboloidal surface. In this way, it can be ensured that the reflection forms a parallel bundle of light that illuminates the hologram at a defined angle. As an alternative, the reflective region can also be designed as a free-form surface, in order to enable further optimization of the illumination or, more specifically, to enable optimal adaptation to the input light of the light emitting diode. As an alternative, the reflective region can be provided with additional optics, depending on the desired light shaping of the reflected light. In particular, the reflective region can be mirrored, because steep illumination angles do not generate a total reflection.

There is the option of designing the optical waveguide in a V shape with two legs and a connecting region between the two legs, where the incident surface is arranged on the first of the legs; the reflective region is arranged on or in the connecting region; and the hologram is arranged on or in the second of the legs. In this case, the incident surface can be arranged on that end of the first leg that faces away from the connecting region. This feature results in a front side, formed by the second leg, with the hologram, from which the light can emerge in the desired distribution, and a back side, which is partially formed by the first leg and in front of which and in which the light, emitted by the light source, can propagate in the transverse direction. In this case, in particular, only one light emitting diode, arranged, for example, in the center, can be provided, with the light emitting diode being arranged at a distance from the incident surface. Nevertheless, the result is an efficient illumination of the hologram in the optical waveguide that is designed to be narrow and wide, because the entire height of the optical waveguide is used for the light propagation before it enters into the first leg and in the first leg. The installation position of the illumination apparatus in the motor vehicle can be chosen such that the connecting region is arranged at the top; and those ends of the legs that face away from the connecting region are arranged at the bottom. As an alternative, the illumination apparatus can also be installed the other way around in the motor vehicle, so that the connecting region is arranged at the bottom; and those ends of the legs that face away from the connecting region are arranged at the top.

It can be provided that the incident surface is concavely curved, where the incident surface has, in particular, the shape of a partial hollow cone. As a result, a neutral light incident, adapted to the divergence of the light emitted by the light source, can be achieved.

It is possible for the edges of the incident surface that abut on the front and the rear surfaces of the first leg to be rounded. The rounded edges are not only useful in terms of production technology, but also in terms of lighting technology, because they easily deflect light in the edge region, so that the light leaves the optical waveguide or at least interferes only slightly with the accurately angled illumination of the hologram. In this case, the rounded edges can also be provided with a black coating or a black lacquer.

It can be provided that the angle between the two legs is between 10° and 120°, preferably between 20° and 90°, in particular, between 30° and 70°. The selected angle between the two legs of the optical waveguide is defined by the illumination angle, with which the hologram has to be illuminated, in order to reconstruct the hologram. A steep illumination angle of 50° to 80° from the perpendicular on the hologram produces a narrow angle between the two legs of the optical waveguide, an aspect that is advantageous for a compact design that does not require much installation depth. In the case of shallow illumination angles of, for example, 20° to 40° from the perpendicular on the hologram, the angle between the two legs of the optical waveguide becomes larger, so the optical waveguide loses its compactness with respect to the installation depth.

It is possible for the illumination apparatus to comprise a panel, preferably a blackened panel, which is arranged between the two legs. The panel in black is important for a hologram, in order to offer a high contrast to a black surface on the back for the reconstructed hologram or, more specifically, the holographic image. For example, a film, which is provided with a volume hologram and which is glued onto the second leg, has a high degree of transparency, because the holographic image can only be seen when illuminated. As a result, the intermediate panel surface can be used to show, for example, a graphic pattern or element or a decorative element, such as, for example, letters or text or symbols, or any other additional element. Furthermore, the panel can also be used simultaneously as a holding element for the LED printed circuit board and the optical waveguide, in order to form an assembly or rather a module from all the components. In this case, it makes sense to be able to provide a fastening geometry that is concealed behind a front-sided output area, arranged on the second leg, and the intermediate panel, in order to be able to provide a series of several optical waveguides in a lateral direction.

It can be provided that the hologram is a transmission hologram, which is arranged, in particular, on that surface of the second leg that faces away from the first leg. The transmission hologram can be in the form of a volume hologram, stored in a film, where the film can be glued onto that surface of the second leg that faces away from the first leg. The transmission hologram can be designed, for example, as an edge-lit hologram that is exposed at large angles.

As an alternative, it can be provided that the hologram is a reflection hologram, which is arranged, in particular, on that surface of the second leg that faces the first leg, preferably with the optical waveguide having an exit surface on that side of the second leg that is opposite the reflection hologram. For example, the reflection hologram can also be in the form of a volume hologram, stored in a film, where the film can be glued onto that surface of the second leg that faces the first leg. The reflection hologram can also be in the form of an edge-lit hologram that is exposed at large angles.

According to another aspect, the average distance between the incident surface and the reflective region is at least half as great as the average distance from the reflective region to the hologram and that at least one surface of the optical waveguide, the surface being arranged between the incident surface and the reflective region, is provided with a coating or a lacquer, in particular, is provided with a black coating or a black lacquer. In this context, for example, the optical waveguide can be designed in a V shape with two legs and a connecting region between the two legs, where the incident surface is arranged on the first of the legs; the reflective region is arranged on or in the connecting region; and the hologram is arranged on or in the second of the legs, where that surface of the first leg that faces away from the second leg and/or that surface of the first leg that faces the second leg is/are provided with the coating or the lacquer. The coating or the lacquer on the front surface and the rear surface of the first leg can reduce or ideally completely eliminate reflections on these surfaces. As a result, double images and blurring in the image, produced by the hologram, can also be reduced or eliminated. This implementation can also ensure a clean, accurately angled illumination of the hologram by largely eliminating these reflections.

BRIEF DESCRIPTION OF THE DRAWINGS

The disclosure is explained in more detail below with reference to the attached drawings.

Identical and functionally identical parts are provided with the same reference numerals and symbols in the figures.

DETAILED DESCRIPTION

The first embodiment of an illumination apparatus of the present disclosure shown in FIG. 1 to FIG. 5 comprises a light source 1, which is designed as a light emitting diode (LED) and which is arranged on a printed circuit board 2.

Figure 1:
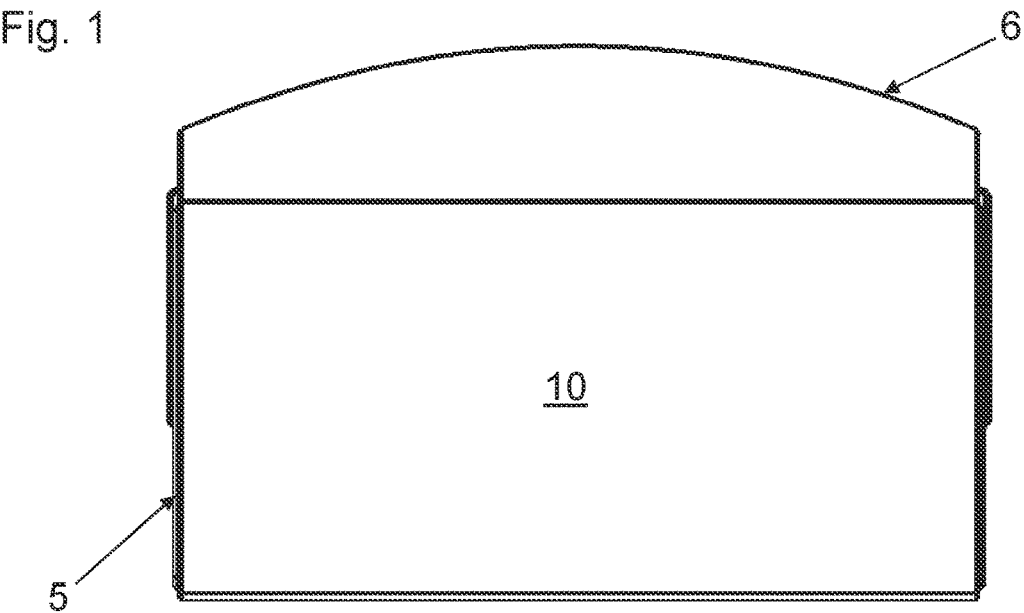
FIG. 1 is a front view of a first embodiment of an illumination apparatus of the present disclosure.
Figure 2:
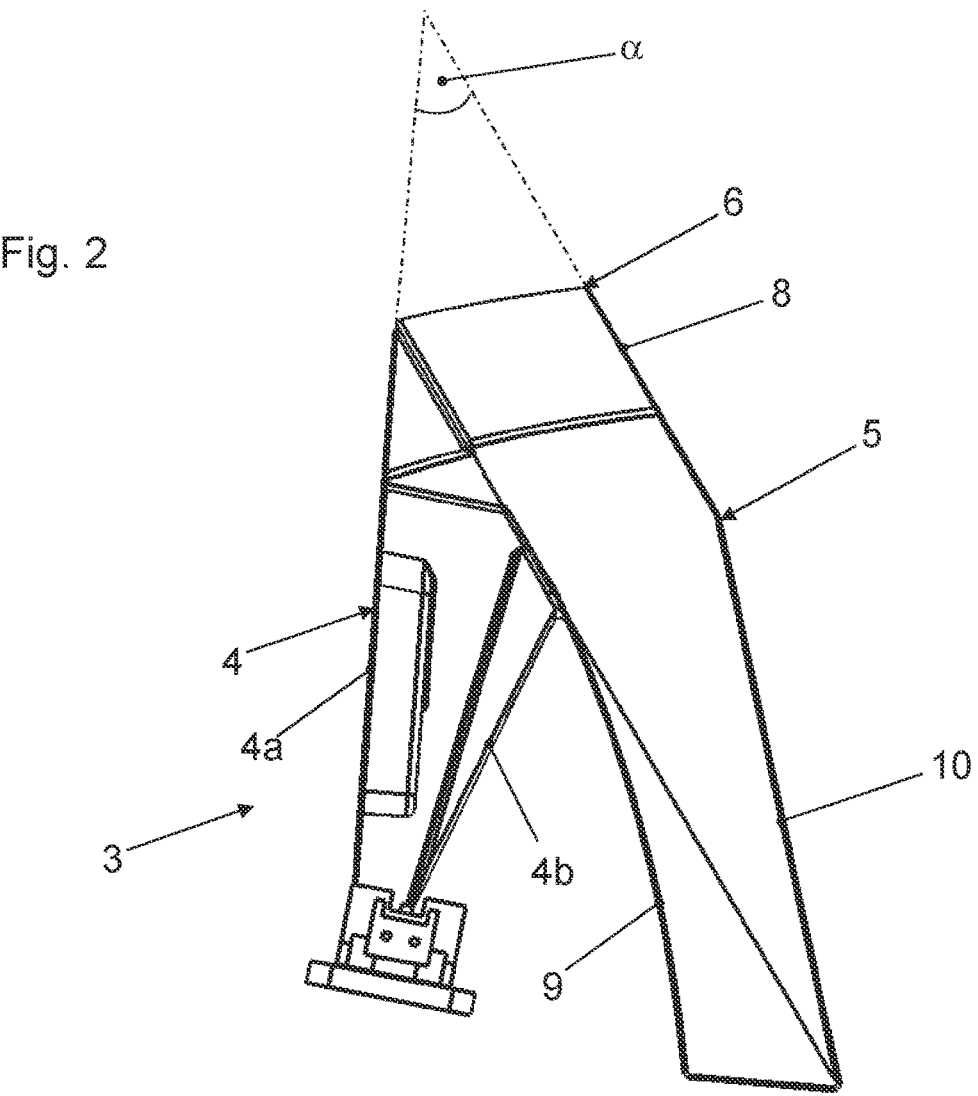
FIG. 2 is a side view of the illumination apparatus according to FIG. 1.

The illumination apparatus further comprises an optical waveguide 3, which has a substantially V-shaped cross section (see FIG. 2). The optical waveguide 3 has a first leg 4, a second leg 5, and a connecting region 6 connecting the two legs 4, 5.

Figure 3:
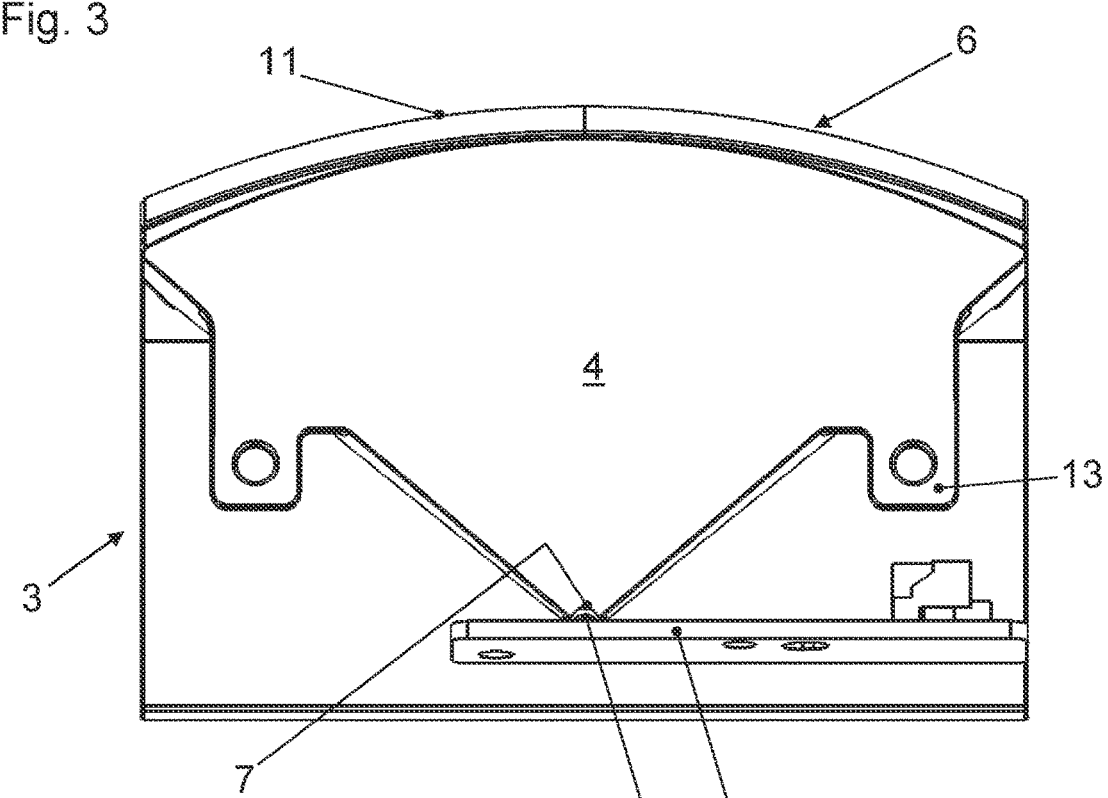
FIG. 3 is a rear view of the illumination apparatus according to FIG. 1.
Figure 4:
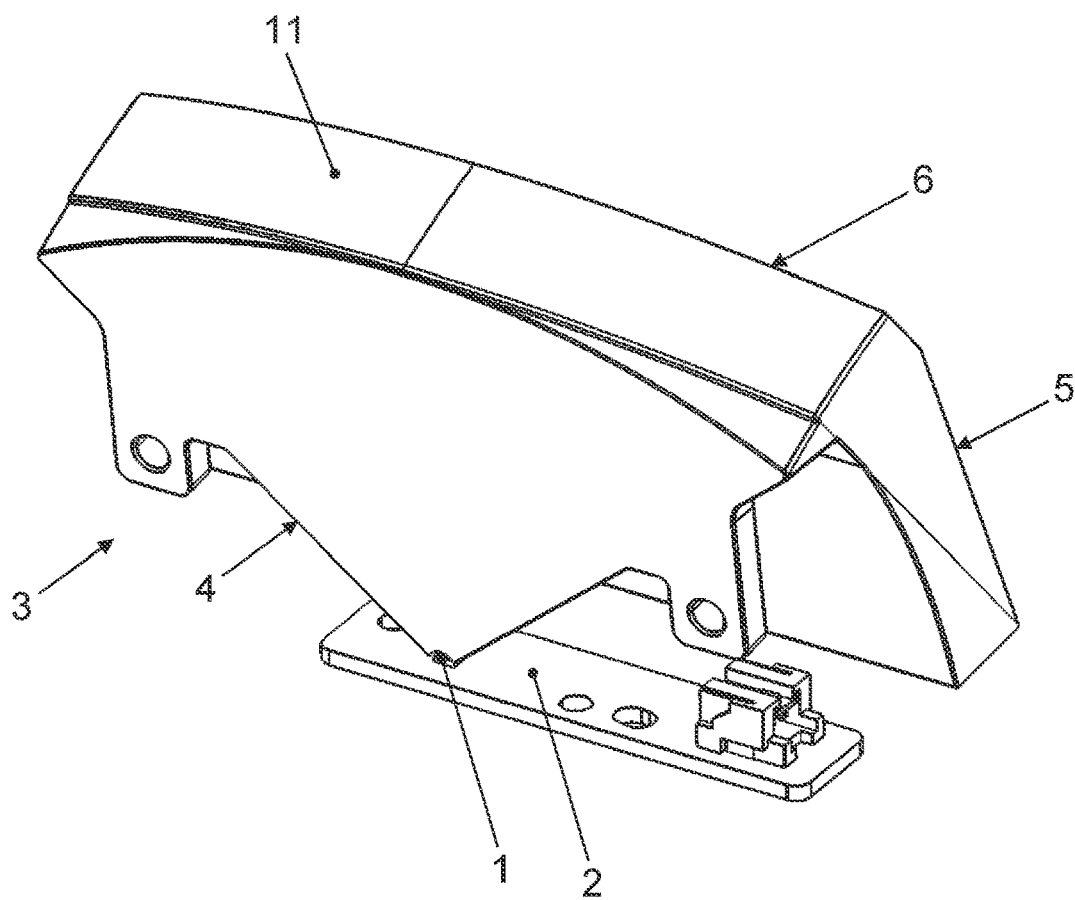
FIG. 4 is a perspective view of the illumination apparatus according to FIG. 1.
Figure 5:
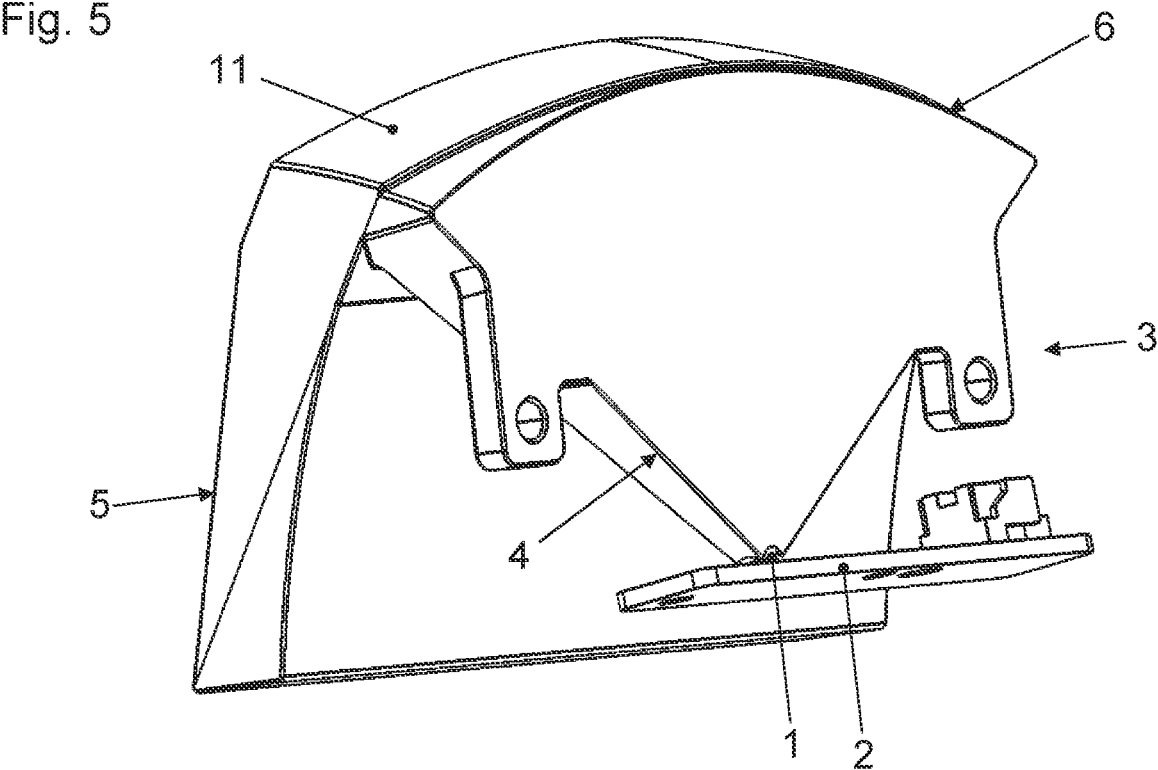
FIG. 5 is another perspective view of the illumination apparatus according to FIG. 1.

The first leg 4 has an incident surface 7 for the light, emitted by the light source 1, on its end facing away from the connecting region 6 (see FIG. 3). Starting from the incident surface 7, the first leg 4 widens in a V shape in a corresponding transverse direction (see the direction from left to right in FIG. 3) until it reaches its greatest extent in the connecting region 6. The V-shaped widening offers the possibility of achieving space for fastening elements 13, with which the optical waveguide 3 can be fastened, on the outer sides of the first leg 4.

The second leg 5 has an upper section 8 and a lower section 9, which is slightly angled relative to the upper section 8. The lower section 9 of the second leg 5 forms on its side, facing away from the first leg 4, an exit surface, onto which a hologram 10 in the form of a volume hologram, read into a film, is applied, in particular, glued, from the outside.

Figure 15:
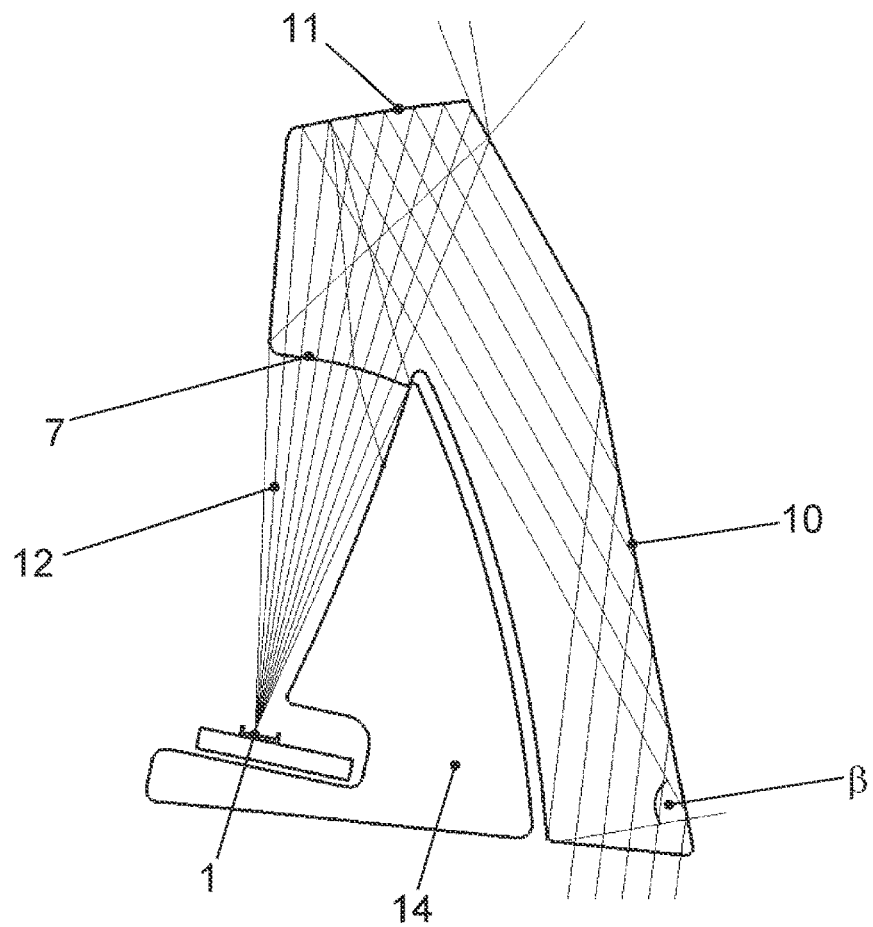
FIG. 15 is a side view of the illumination apparatus of FIG. 11 with plotted beam paths of the light, produced by the light source.

The hologram 10 is a transmission hologram, with which the light, passing through from the exit surface, can interact. With a correspondingly small angle α between the two legs 4, 5, the hologram is also an edge-lit hologram, because the illumination angle β, at which the hologram 10 must be illuminated, becomes then comparatively large, in order to reconstruct the holographic image (see FIG. 15).

As an alternative, it can be provided that, instead of the hologram 10 designed as a transmission hologram, a reflection hologram (not shown) is provided, which is arranged on that surface of the second leg 5 that faces the first leg 4. For example, the reflection hologram can also be designed in the form of a volume hologram, stored in a film, where the film can be glued onto that surface of the lower section 9 of the second leg 5 that faces the first leg 4. In this case, light, emitted by the reflection hologram, can emerge from the optical waveguide 3 through the exit surface, formed on that side of the lower section 9 of the second leg 5 that faces away from the first leg 4. The reflection hologram can also be designed as an edge-lit hologram that is illuminated at large angles.

The connecting region 6 is provided with a reflective coating for the most part on the outside and, thus, serves as a reflective region 11. Correspondingly, light 12, emitted by the light source 1 and entering the optical waveguide 3 through the incident surface 7, will pass through the first leg 4, will impinge on the reflective region 11 and will be reflected by the reflective region downwards in FIG. 2 into the second leg 5. In the second leg 5 the light passes through the exit surface of the lower section 9 of the second leg 5 into the hologram 10.

Figure 9:
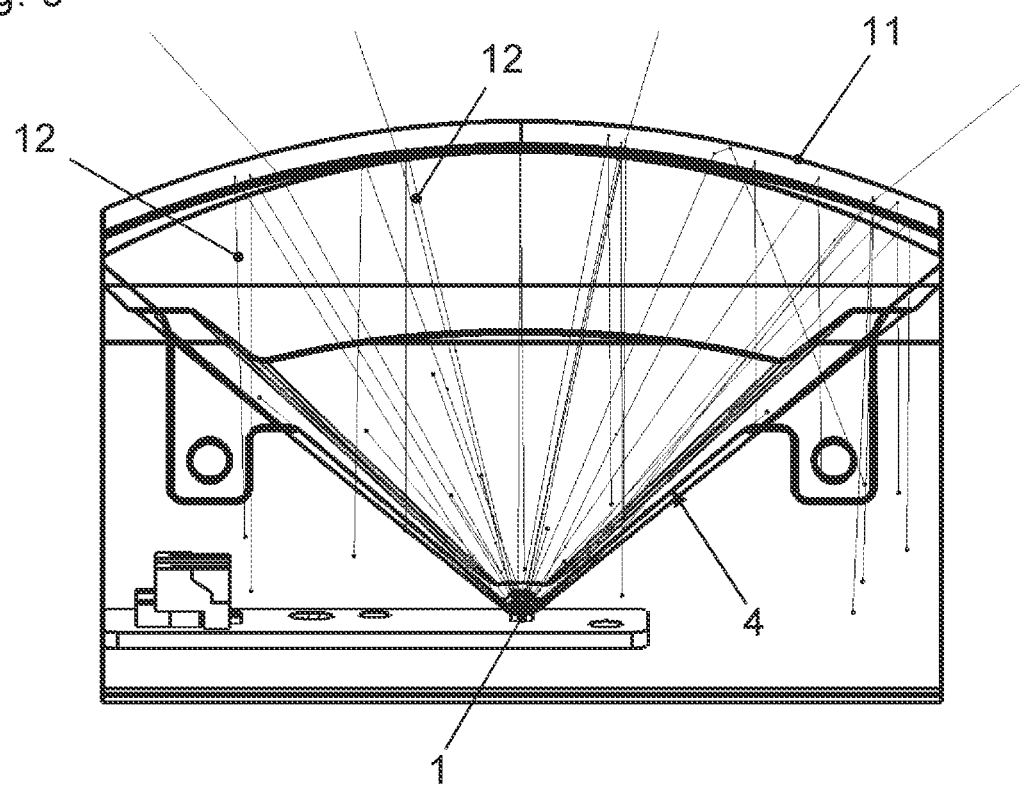
FIG. 9 is a rear view of the illumination apparatus of FIG. 8 with plotted beam paths of the light, produced by the light source.

In this case, the reflective region 11 is convexly curved and, in particular, is designed as a paraboloidal surface. This curvature offers the possibility of achieving that those components of the light 12 that impinge on the reflective region 11 at different angles are reflected essentially in the same direction downwards in FIG. 9. The substantially mutually parallel light beams of the light 12 ensure essentially the same illumination angle β of the hologram 10, an aspect that is advantageous for an effective reconstruction of the holographic image.

As an alternative, it can be provided that the reflective region 11 is designed as a free-form surface, in order to enable further optimization of the illumination or, more specifically, to enable optimal adaptation to the input light 12 of the light source 1. As an alternative, the reflective region 11 can be provided with additional optics, depending on the desired light shaping of the reflected light 12.

In the design of the reflective region 11 as a transition from the input region of the first leg 4 to the illumination region of the second leg 5, surface areas, which would produce scattered light or false light in the reflection, may be produced or may be necessary for reasons relating to the production of a plastic injection molded part. Therefore, such surface areas could generate light that does not maintain the desired illumination angle and is reflected, for example, across the optical waveguide 3 or is reflected multiple times. In order to eliminate such unwanted disturbances in the illumination of the output surface that is relevant in terms of lighting technology, it is provided that these surface areas are not mirrored. As a result, light, impinging on these surface areas, can exit directly and is not internally reflected in the optical waveguide 3. This aspect enhances the quality of the illumination of the hologram 10.

FIG. 2 and FIG. 3 show that the average distance between the incident surface 7 and the reflective region 11 is essentially as great as the average distance from the reflective surface 11 to the hologram 10. Owing to the comparatively large distance between the incident surface 7 and the reflective region 11, the first leg 4 can be used effectively as an input path, on which the light 12 can expand in the transverse direction over the entire width of the reflective region 11 (see FIG. 9). Because at the same time the width of the reflective region 11 corresponds in essence to the width of the hologram 10, the hologram 10 can be uniformly illuminated with a single light emitting diode.

Figure 8:
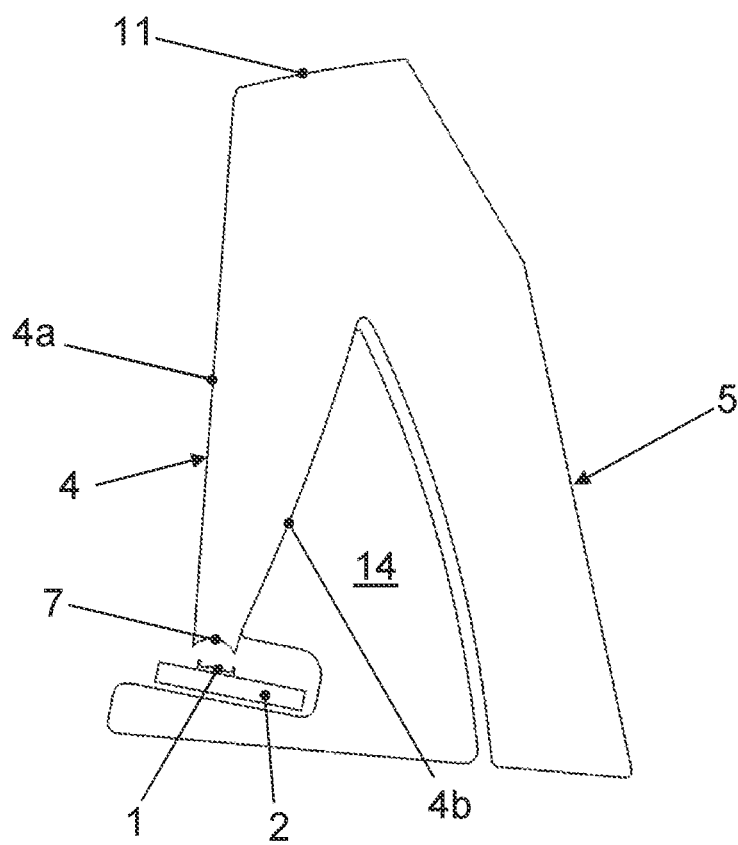
FIG. 8 is a sectional view of a second embodiment of an illumination apparatus of the present disclosure.

FIG. 8 shows a second embodiment of an illumination apparatus, in which a panel 14 is provided between the two legs 4, 5. The panel 14 can be blackened, in particular, on its side facing the second leg. For a hologram 10, the panel 14 in black is important, in order to offer a high contrast to a black surface on the back for the reconstructed hologram or, more specifically, the holographic image. Furthermore, the intermediate panel surface can be used to show, for example, a graphic pattern or element or a decorative element, such as, for example, letters or text or symbols, or any other additional element.

Furthermore, the panel 14 can also serve as a holding element for the printed circuit board 2 and the optical waveguide 3, in order to form an assembly or, more specifically, a module from all the components. In particular, the fastening elements 13, shown in FIG. 3, can be screwed to the panel.

Figure 6:
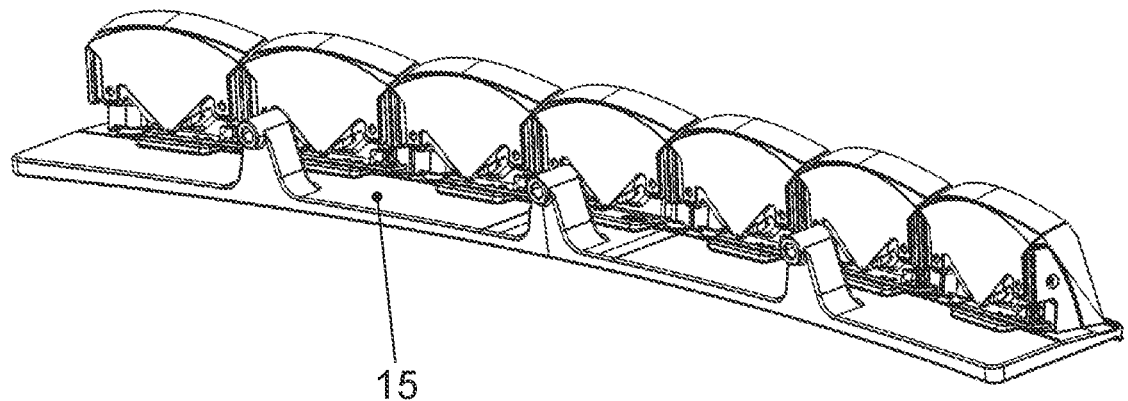
FIG. 6 is a perspective view of several interconnected illumination apparatuses according to FIG. 1.
Figure 7:
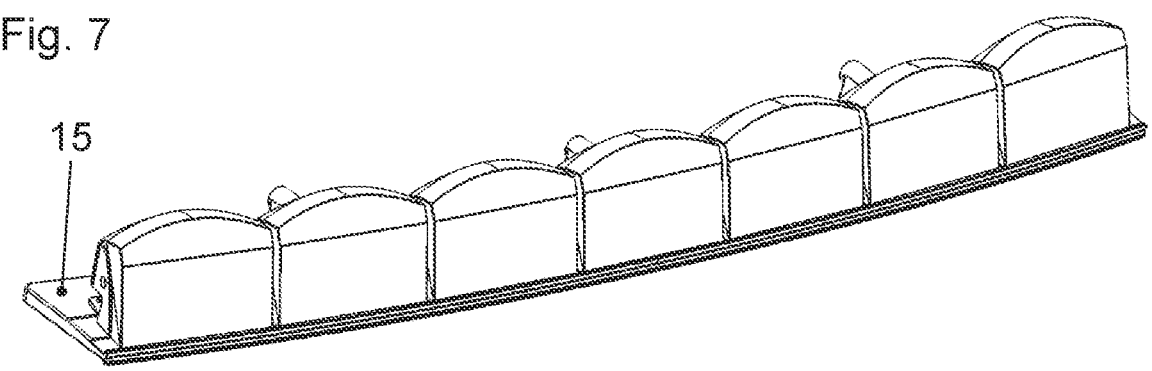
FIG. 7 is another perspective view of several interconnected illumination apparatuses according to FIG. 1.

FIG. 6 and FIG. 7 illustrate that a plurality of the illumination apparatuses can be arranged side by side on a common bracket 15. As a modular approach, this version offers the possibility of positioning several illumination apparatuses side by side for a larger latitudinal extent of the appearance and, thus, offers the possibility of adapting the illuminated area or the size of the holographic image, composed of several individual images, in relation to the narrow and elongated lighting version.

Furthermore, it is also provided in the embodiments according to FIG. 1 to FIG. 9 that the front surface 4a and the rear surface 4b of the first leg 4 (see, for example, FIG. 2 and FIG. 8) are coated with an absorbent coating (not shown) or are provided with an absorbent lacquer (not shown). This coating or this lacquer may be, in particular, black.

Figure 10:
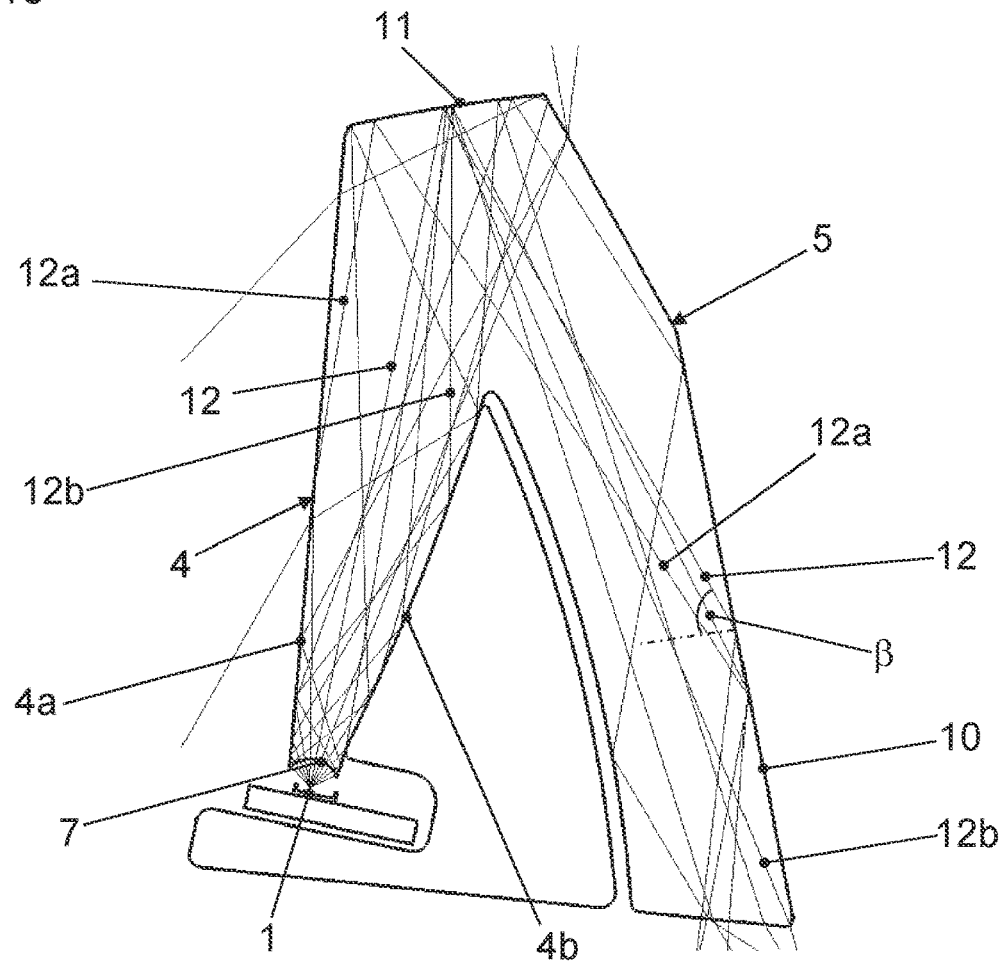
FIG. 10 is a side view of an illumination apparatus that is not covered by the disclosure, with plotted beam paths of the light, produced by the light source.
Figure 11:
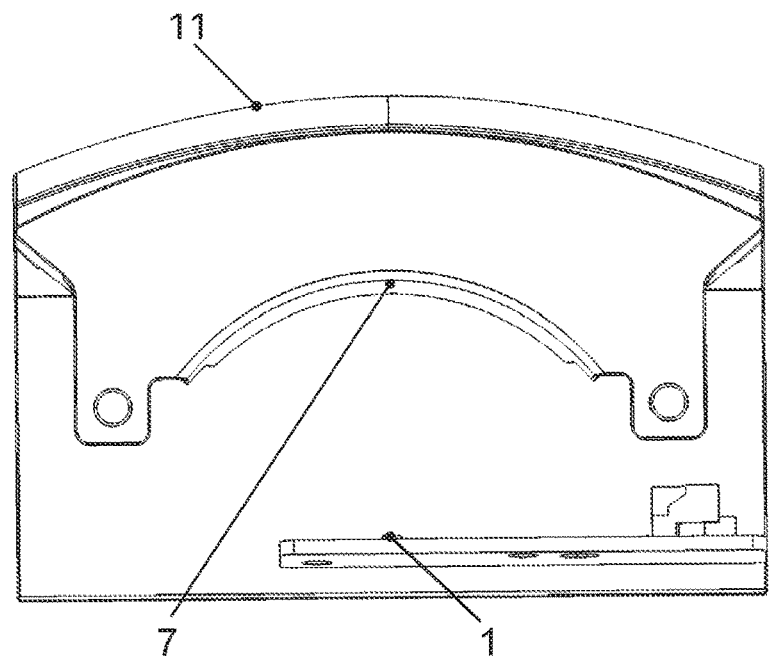
FIG. 11 is a rear view of a third embodiment of an illumination apparatus of the present disclosure.
Figure 12:
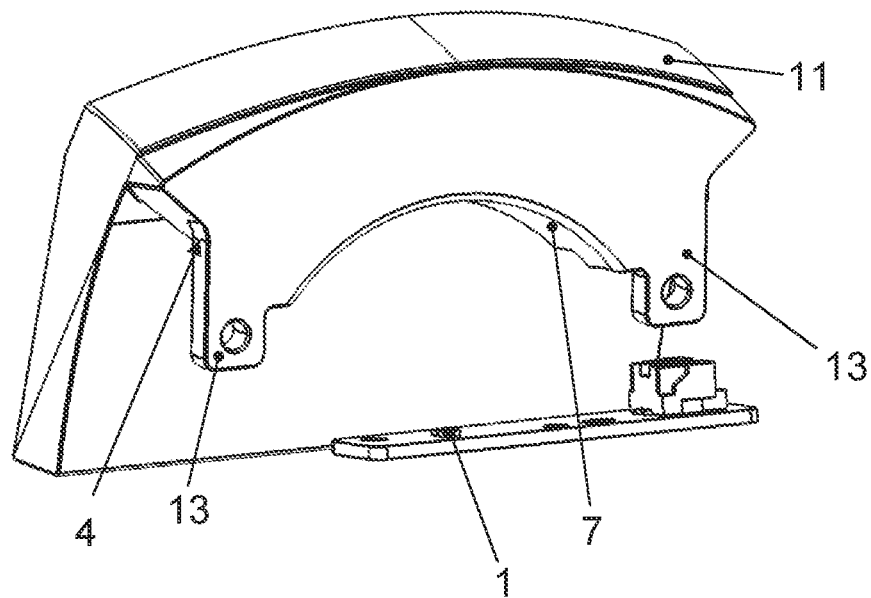
FIG. 12 is a perspective view of the illumination apparatus according to FIG. 11.
Figure 13:
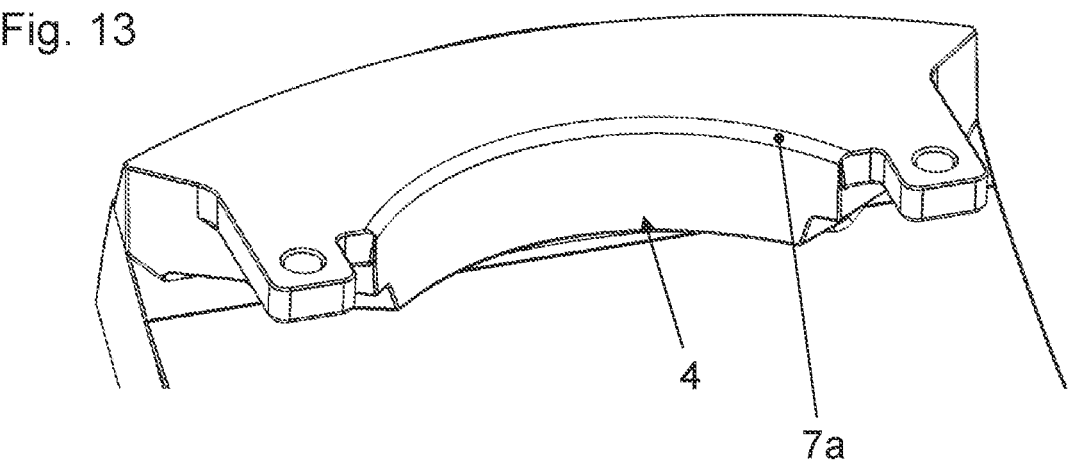
FIG. 13 is a perspective view of a detail of the illumination apparatus according to FIG. 11.
Figure 14:
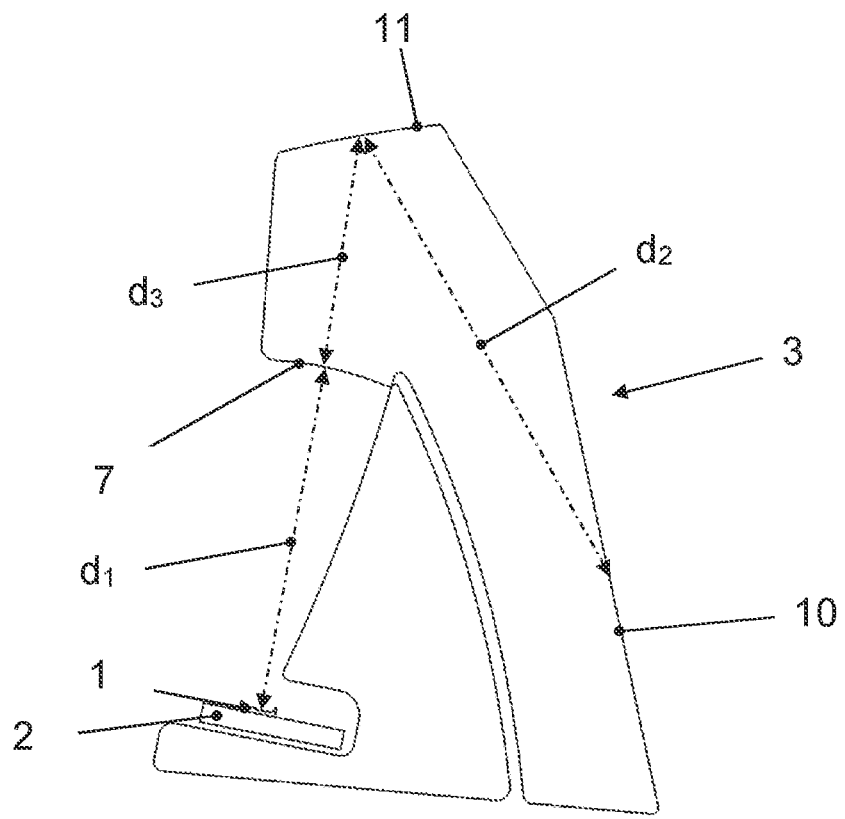
FIG. 14 is a side view of the illumination apparatus according to FIG. 11.

The coating or the lacquer can be used to eliminate reflections of the input light 12 on the front and the rear surfaces 4a, 4b of the first leg 4. FIG. 10 illustrates the extent to which such reflections can lead to an illumination of the hologram 10 at different angles when an illumination apparatus that has no absorbent coating and no absorbent lacquer on the front and/or the rear surface 4a, 4b of the first leg 4 is used. It can be seen that light beams 12a, 12b, reflected by the front surface 4a or the rear surface 4b of the first leg 4, impinge on the hologram 10 at significantly different angles than light 12 that has propagated directly from the incident surface 7 to the reflective region 11. This aspect can lead to double images and blurring in the image, produced by the hologram 10.

The coating or the lacquer on the front surface 4a and the rear surface 4b of the first leg 4 can reduce or ideally completely eliminate reflections on the front surface 4a or the rear surface 4b of the first leg 4. As a result, double images and blurring in the image, produced by the hologram 10, can also be reduced or eliminated.

One disadvantage of the coating or the lacquering is the additional manufacturing process for each optical waveguide 3 with corresponding costs. Another disadvantage is the need for a practical adjoining storage and transport device for the coated optical waveguides 3, so that the coating or lacquering is not damaged during further assembly. Furthermore, the narrow space between the legs 4, 5 means that a coating process or lacquering process cannot usually be carried out optimally as far as up to the upper narrow area of the inverted V; and, as a result, the effect of the coating or lacquering does not achieve the desired optimal impact.

Therefore, the third embodiment, shown in FIG. 11 to FIG. 18, differs from the first two in that the first leg 4 is designed to be significantly shorter. The incident surface 7 is now arranged next to and to a large extent even above the two fastening elements 13 (see FIG. 12). As a result, the coupling-in takes place closer to the reflective region 11 of the optical waveguide 3, so that virtually no disruptive reflections can occur on the front surface 4a and the rear surface 4b of the first leg 4. Also, no light 12, emitted by the light source 1, can penetrate directly into the second leg 5, because the second leg 5 of the optical waveguide 3 is covered by the panel 14 (see FIG. 14).

Therefore, the result is a clean, accurately angled illumination of the hologram 10. The accurately angled illumination can be clearly seen from the beam path of the light 12, plotted in FIG. 15, where all of the plotted light beams, impinging on the hologram 10, enclose with the perpendicular on the hologram 10 essentially the same angle $\beta$.

The incident surface 7 is concavely curved and, in particular, has the shape of a partial hollow cone (see, in particular, FIG. 13), as a result of which a neutral light incident, adapted to the divergence of the light 12, emitted by the light source 1, is achieved.

Figure 16:
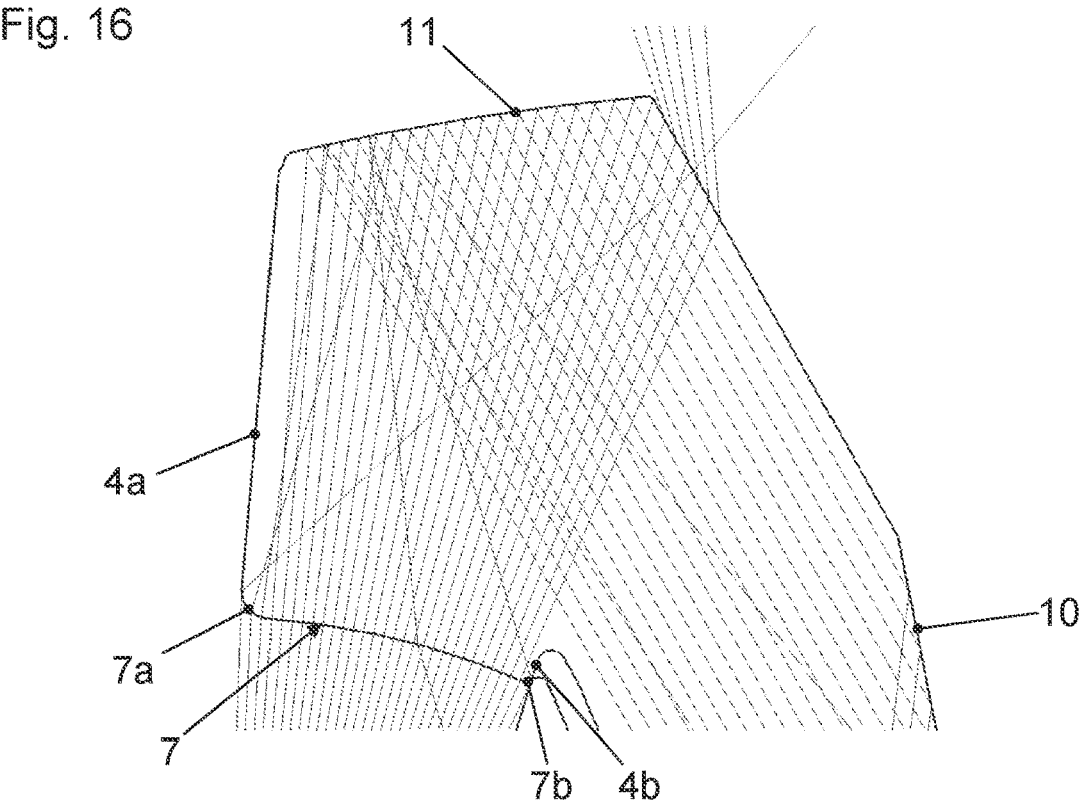
FIG. 16 is a detail of FIG. 15.

FIG. 16 illustrates that the edges 7a, 7b of the incident surface 7 that abut on the front and the rear surface 4a, 4b of the first leg 4 are rounded. The rounded edges 7a, 7b are not only useful in terms of production technology, but also in terms of lighting technology, because they easily deflect light 12 in the edge region. This applies, in particular, to the rear edge 7b, which prevents light from being able to impinge on the rear surface 4b of the first leg 4, the rear surface being arranged above the incident surface 7. The deflected light is largely oriented such that it leaves the optical waveguide 3 or has very little impact as stray light on the hologram 10.

There is definitely the possibility of additionally providing the rounded edges 7a, 7b with a black coating or a black lacquer.

The length of the beam path that is required for expanding the light 12 to the width of the reflective region 11 is created on the way from the light source 1 to the incident surface 7. The average distance d1 between the light source 1 and the incident surface 7 corresponds to more than half the average distance d2 between the reflective region 11 and the hologram 10 (see FIG. 14). In particular, the average distance d1 between the light source 1 and the incident surface 7 together with the average distance d3 between the incident surface 7 and the reflective region 11 is between 0.8 and 1.2 times as great, preferably about the same amount as the average distance d2 between the reflective region 11 and the hologram 10.

The third embodiment offers even more advantages over the first two embodiments. The entire optical waveguide 3 is more compact, so that the amount of material required is reduced; and an injection molding process, which is used to produce the optical waveguide 3, can be controlled better than in the case of a larger optical waveguide. In particular, due to the shortening of the first leg 4 in comparison to an optical waveguide according to FIGS. 1 to 9, it is possible to eliminate the deeply incised V contour.

Figure 17:
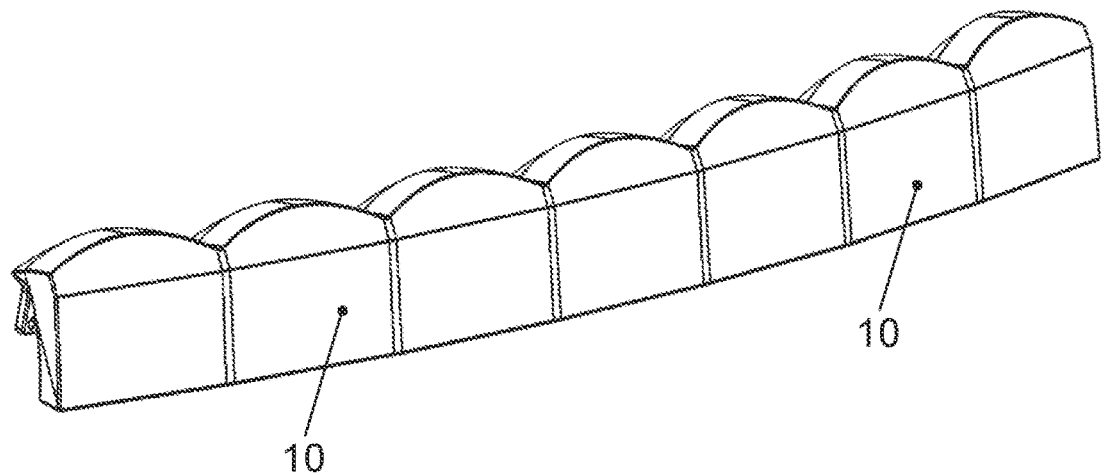
FIG. 17 is a perspective view of several interconnected illumination apparatuses according to FIG. 11.
Figure 18:
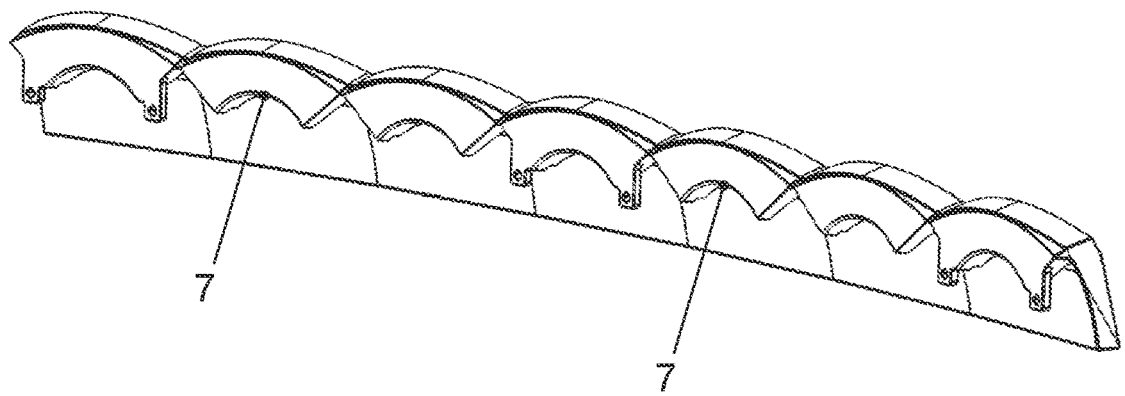
FIG. 18 is an additional perspective view of several interconnected illumination apparatuses according to FIG. 11.

FIG. 17 and FIG. 18 illustrate that a plurality of third embodiments of the illumination apparatus can also be arranged side by side.

Figure 19:
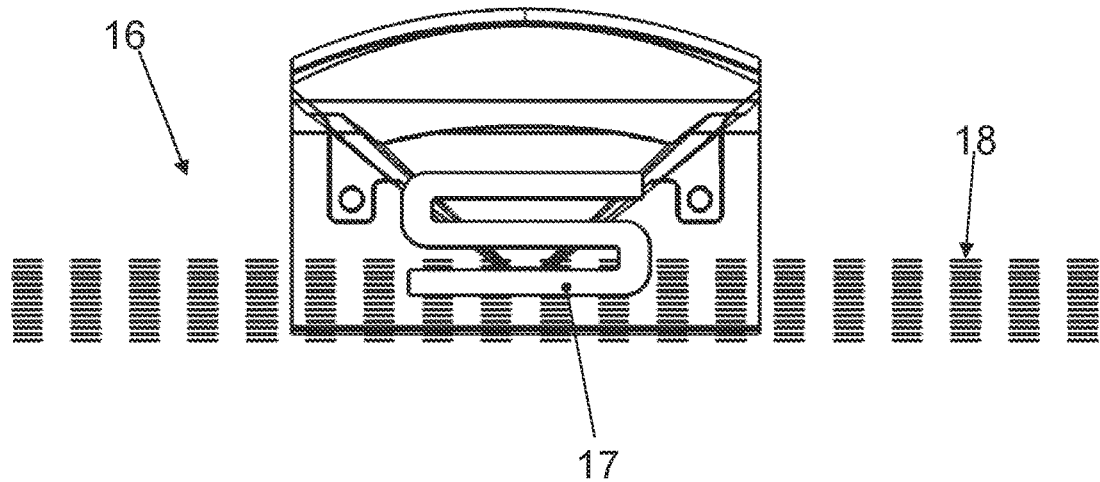
FIG. 19 is a front view of a fourth embodiment of an illumination apparatus of the present disclosure, showing a reconstruction of an image, stored in a hologram of the embodiment.
Figure 20:
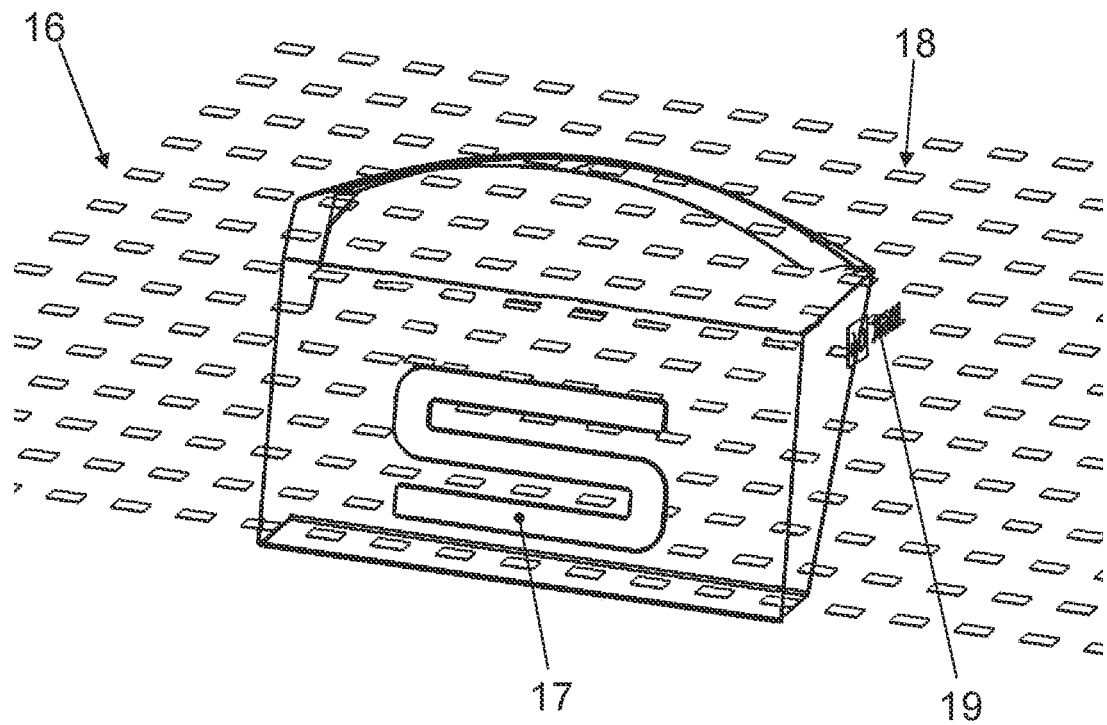
FIG. 20 is a front view of a fifth embodiment of an illumination apparatus of the present disclosure, showing a reconstruction of an image, stored in a hologram of the embodiment.
Figure 21:
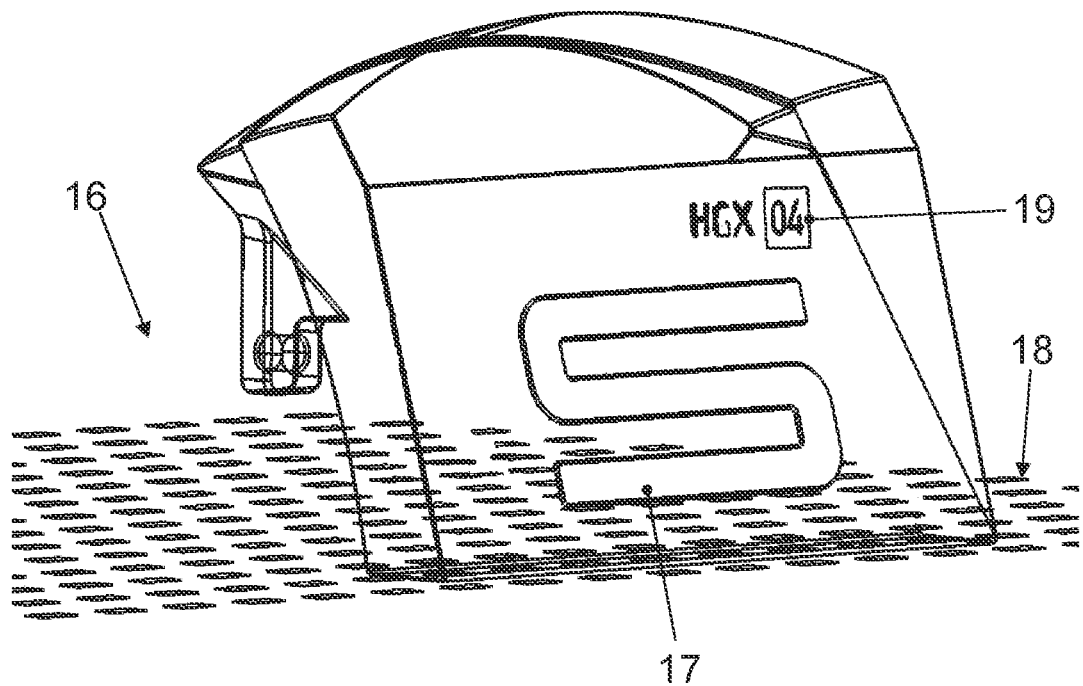
FIG. 21 is a front view of a sixth embodiment of an illumination apparatus of the present disclosure, showing a reconstruction of an image, stored in a hologram of the embodiment.

Any objects and geometries can be provided as the holographic image, produced by the hologram 10. FIG. 19 to FIG. 21 illustrate some examples of the holographic image 16 that are produced. The examples of a holographic implementation show a letter 17 and a background pattern 18 and a bottom pattern, respectively. Furthermore, FIG. 20 and FIG. 21 also show a lateral offset line of text 19.

What is claimed is:

1. An illumination apparatus for a motor vehicle, comprising:
   a light source;
   an optical waveguide with an incident surface and a reflective region; and
   a hologram arranged on or in the optical waveguide, wherein:
   the illumination apparatus is configured such that light emitted by the light source enters the incident surface of the optical waveguide in a direction of the reflective region, is reflected by the reflective region inside the optical waveguide in the direction of the hologram, and interacts with the hologram; and
   an average distance between the light source and the incident surface is at least half as great as an average distance between the reflective region and the hologram.

2. The illumination apparatus of claim 1, wherein the average distance between the light source and the incident surface together with an average distance between the incident surface and the reflective region is between 0.8 and 1.2 times as great as the average distance between the reflective region and the hologram.

3. The illumination apparatus of claim 1, wherein the reflective region in a first transverse direction, which is substantially perpendicular to a central connecting direction from the incident surface to the reflective region, has a greater extent than an average distance between the light source and the reflective region and/or has a greater extent than the average distance from the reflective surface to the hologram.

4. The illumination apparatus of claim 3, wherein the extent of the reflective region in the first transverse direction is between 0.8 and 1.2 times as great as an extent of the hologram in the first transverse direction.

5. The illumination apparatus of claim 3, wherein the extent of the reflective region in the first transverse direction is approximately the same amount as an extent of the hologram in the first transverse direction.

6. The illumination apparatus of claim 1, wherein the reflective region is convexly curved, in particular, is designed as a paraboloidal surface.

7. The illumination apparatus of claim 1, wherein the reflective region is a paraboloidal surface.

8. The illumination apparatus of claim 1, wherein the optical waveguide is designed in a V shape with first and second legs and a connecting region between the first and second legs, wherein: the incident surface is arranged on the first leg; the reflective region is arranged on or in the connecting region; and the hologram is arranged on or in the second leg.

9. The illumination apparatus of claim 8, wherein the incident surface is arranged on an end of the first leg facing away from the connecting region.

10. The illumination apparatus of claim 8, wherein the incident surface is concavely curved.

11. The illumination apparatus of claim 10, wherein the incident surface has the shape of a partial hollow cone.

12. The illumination apparatus of claim 10, wherein edges of the incident surface that abut on front and rear surfaces of the first leg are rounded.

13. The illumination apparatus of claim 8, wherein an angle (a) between the first and second legs is between 10° and 120°.

14. The illumination apparatus of claim 8, wherein an angle (a) between the first and second legs is between 30° and 70°.

15. The illumination apparatus of claim 8, further comprising a blackened panel arranged between the first and second legs.

16. The illumination apparatus of claim 8, wherein the hologram is a transmission hologram arranged on a surface of the second leg facing away from the first leg.

17. The illumination apparatus of claim 8, wherein the hologram is a reflection hologram arranged on a surface of the second leg facing the first leg.

18. The illumination apparatus of claim 17, wherein the optical waveguide has an exit surface on a side of the second leg opposite the reflection hologram.

19. An illumination apparatus for a motor vehicle, comprising:
   a light source;
   an optical waveguide with an incident surface and a reflective region; and
   a hologram arranged on or in the optical waveguide, wherein:
   the illumination apparatus is configured such that light emitted by the light source enters the incident surface of the optical waveguide in a direction of the reflective region, is reflected by the reflective region inside the optical waveguide in a direction of the hologram, and interacts with the hologram; and
   an average distance between the incident surface and the reflective region is at least half as great as an average distance from the reflective region to the hologram, and at least one surface of the optical waveguide arranged between the incident surface and the reflective region is provided with a black coating or a black lacquer.

20. The illumination apparatus of claim 19, wherein:
   the optical waveguide is designed in a V shape with first and second legs and a connecting region between the first and second legs, wherein the incident surface is arranged on the first leg, the reflective region is arranged on or in the connecting region, and the hologram is arranged on or in the second leg; and
   a surface of the first leg facing away from the second leg and/or a surface of the first leg facing the second leg is/are provided with the black coating or the black lacquer.

* * * * *